(12) United States Patent
Tiirola et al.

(10) Patent No.: US 10,291,342 B2
(45) Date of Patent: May 14, 2019

(54) TDD DATA TRANSMISSION ON MULTIPLE CARRIERS WITH SUB FRAMES RESERVED FOR PREDETERMINED TRANSMISSION DIRECTIONS

(75) Inventors: Esa Tapani Tiirola, Kempele (FI); Kari Juhani Hooli, Oulu (FI); Kari Pekka Pajukoski, Oulu (FI); Sabine Roessel, Munich (DE)

(73) Assignee: Nokia Solutions and Networks Oy, Espoo (FI)

(*) Notice: Subject to any disclaimer, the term of this patent is extended or adjusted under 35 U.S.C. 154(b) by 365 days.

(21) Appl. No.: 13/984,607

(22) PCT Filed: Feb. 11, 2011

(86) PCT No.: PCT/EP2011/052038
§ 371 (c)(1),
(2), (4) Date: Aug. 30, 2013

(87) PCT Pub. No.: WO2012/107102
PCT Pub. Date: Aug. 16, 2012

(65) Prior Publication Data
US 2013/0336178 A1    Dec. 19, 2013

(51) Int. Cl.
| H04J 3/06 | (2006.01) |
| H04W 56/00 | (2009.01) |
| H04L 5/00 | (2006.01) |
| H04L 5/14 | (2006.01) |
| H04W 72/04 | (2009.01) |

(52) U.S. Cl.
CPC .............. *H04J 3/06* (2013.01); *H04L 5/0005* (2013.01); *H04L 5/14* (2013.01); *H04W 56/00* (2013.01); *H04W 72/0453* (2013.01)

(58) Field of Classification Search
CPC ... H04B 1/56; H04B 7/2656; H04W 72/0446; H04W 88/08; H04W 76/02
USPC .......................................................... 370/280
See application file for complete search history.

(56) References Cited

U.S. PATENT DOCUMENTS

| 6,016,311 | A * | 1/2000 | Gilbert et al. ................. 370/280 |
| 6,967,943 | B1 * | 11/2005 | Hamalainen et al. ......... 370/347 |
| 8,542,617 | B2 * | 9/2013 | Choi et al. .................... 370/296 |
| 8,780,790 | B2 * | 7/2014 | Sarkar ........................... 370/324 |
| 2002/0136169 | A1 * | 9/2002 | Struhsaker et al. .......... 370/280 |
| 2004/0208194 | A1 * | 10/2004 | Restivo et al. ................ 370/443 |

(Continued)

FOREIGN PATENT DOCUMENTS

| CN | 101305629 A | 11/2008 |
| EP | 1 879 409 A1 | 1/2008 |

(Continued)

*Primary Examiner* — Gbemileke J Onamuti
*Assistant Examiner* — Sanjay K Dewan
(74) *Attorney, Agent, or Firm* — Harrington & Smith

(57) ABSTRACT

Apparatus and method for communication are provided. The apparatus includes a controller for controlling the transmission and reception of data on one or more carriers utilizing Time Division Duplexing and frames including sub frames, where multiple carriers utilized by different apparatuses are synchronized with each other and a predetermined number of sub frames of each frame are reserved for predetermined transmission directions and a scheduler for allocating the rest of the sub frames carrier specifically either in downlink or uplink direction.

17 Claims, 3 Drawing Sheets

(56) References Cited

U.S. PATENT DOCUMENTS

| | | |
|---|---|---|
| 2005/0041605 A1* | 2/2005 | Benson .................. 370/280 |
| 2010/0182939 A1* | 7/2010 | Ojala et al. ............... 370/280 |
| 2010/0278123 A1 | 11/2010 | Fong et al. ............... 370/329 |
| 2010/0290369 A1* | 11/2010 | Hui et al. ................. 370/279 |
| 2011/0032853 A1* | 2/2011 | Moon et al. .............. 370/280 |
| 2011/0044215 A1* | 2/2011 | Kim et al. ................ 370/280 |
| 2011/0076962 A1* | 3/2011 | Chen et al. ............... 455/68 |
| 2011/0149813 A1* | 6/2011 | Parkvall et al. ........... 370/280 |
| 2011/0188481 A1* | 8/2011 | Damnjanovic et al. .... 370/336 |
| 2011/0211500 A1 | 9/2011 | Sawahashi et al. |
| 2011/0274071 A1* | 11/2011 | Lee et al. ................. 370/329 |
| 2012/0020256 A1* | 1/2012 | Tujkovic ............ H04W 16/14  370/278 |
| 2012/0021753 A1* | 1/2012 | Damnjanovic et al. .... 455/450 |
| 2012/0294203 A1* | 11/2012 | Koorapaty et al. ........ 370/280 |
| 2012/0300681 A1* | 11/2012 | Ji et al. .................... 370/280 |
| 2013/0128781 A1* | 5/2013 | Li ...................... H04W 56/00  370/280 |
| 2013/0176982 A1* | 7/2013 | Han et al. ................. 370/329 |
| 2013/0336178 A1* | 12/2013 | Tiirola et al. ............. 370/280 |
| 2015/0003301 A1* | 1/2015 | He et al. .................. 370/280 |
| 2015/0016316 A1* | 1/2015 | Zhang ............... H04W 72/0446  370/280 |
| 2015/0029910 A1* | 1/2015 | He ..................... H04W 76/02  370/280 |
| 2015/0043392 A1* | 2/2015 | Susitaival ............ H04L 5/1469  370/280 |
| 2015/0085711 A1* | 3/2015 | Wang et al. .............. 370/280 |
| 2015/0117271 A1* | 4/2015 | Liang et al. .............. 370/280 |
| 2015/0117294 A1* | 4/2015 | Li et al. ................... 370/312 |
| 2015/0124663 A1* | 5/2015 | Chen et al. ............... 370/278 |
| 2015/0200739 A1* | 7/2015 | Struhsaker ............ H01Q 1/246  370/280 |
| 2015/0208382 A1* | 7/2015 | Yao ................. H04W 72/0446  370/280 |
| 2016/0044649 A1* | 2/2016 | Frenne ............. H04W 72/0406  370/329 |

FOREIGN PATENT DOCUMENTS

| | | |
|---|---|---|
| JP | 2010062875 A | 3/2010 |
| KR | 20110003286 A | 1/2011 |
| WO | WO 2009/062115 A2 | 5/2009 |
| WO | WO 2010/019012 A2 | 2/2010 |
| WO | WO-2010/051695 A1 | 5/2010 |
| WO | WO 2010049587 A1 | 5/2010 |
| WO | WO 2010/065430 A2 | 6/2010 |
| WO | WO 2010/101939 A2 | 9/2010 |
| WO | WO 2010/138921 A2 | 12/2010 |

* cited by examiner

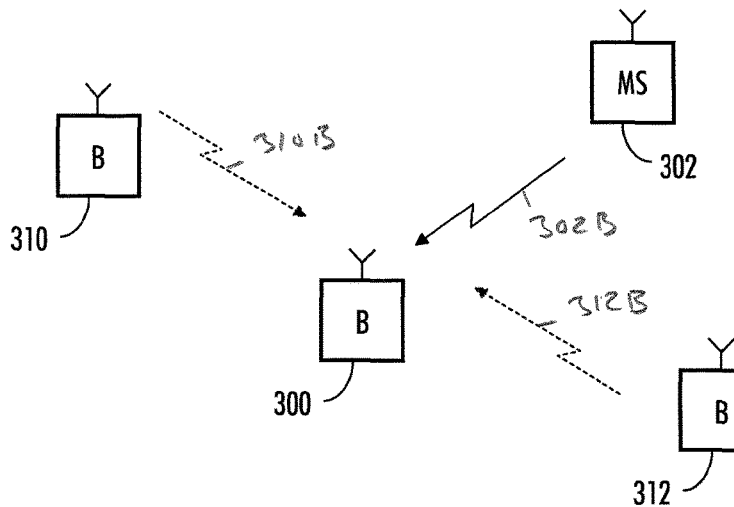
FIG. 3B
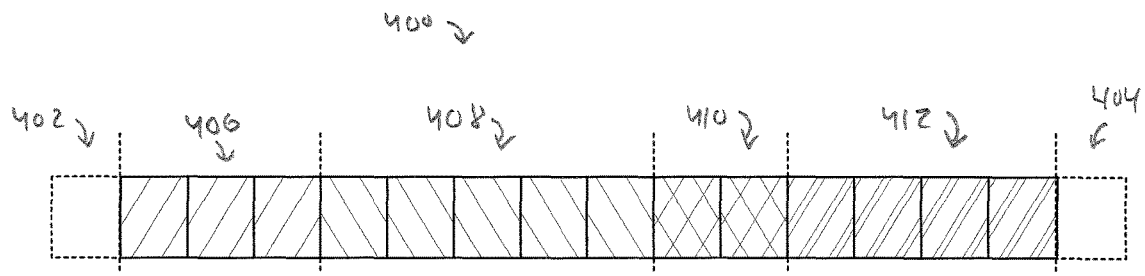
FIG. 4
| 0 | 1 | 2 | 3 | 4 | 5 | 6 | 7 | 8 | 9 |
|---|---|---|---|---|---|---|---|---|---|
| D | S | U | F | F | D | S | U | F | F |
FIG. 5
| 0 | 1 | 2 | 3 | 4 | 5 | 6 | 7 | 8 | 9 |
|---|---|---|---|---|---|---|---|---|---|
| D | S | U | D | D | D | S | U | D | D |
FIG. 6A
| 0 | 1 | 2 | 3 | 4 | 5 | 6 | 7 | 8 | 9 |
|---|---|---|---|---|---|---|---|---|---|
| D | S | U | U | U | D | S | U | U | U |
FIG. 6B

TDD DATA TRANSMISSION ON MULTIPLE CARRIERS WITH SUB FRAMES RESERVED FOR PREDETERMINED TRANSMISSION DIRECTIONS

FIELD

The exemplary and non-limiting embodiments of the invention relate generally to wireless communication networks and, more particularly, to an apparatus and a method in communication networks.

BACKGROUND

The following description of background art may include insights, discoveries, understandings or disclosures, or associations together with disclosures not known to the relevant art prior to the present invention but provided by the invention. Some of such contributions of the invention may be specifically pointed out below, whereas other such contributions of the invention will be apparent from their context.

Wireless communication systems are constantly under development. Developing systems provide a cost-effective support of high data rates and efficient resource utilization. One communication system under development is the 3rd Generation Partnership Project (3GPP) Long Term Evolution (LTE). An improved version of the Long Term Evolution radio access system is called LTE-Advanced (LTE-A). The LTE and LTE-A are designed to support various services, such as high-speed data.

Some new wireless communication systems such as the LTE based systems have adopted the use of Time Division Duplexing (TDD). LTE based systems may employ both TDD and Frequency Division Duplexing (FDD). In TDD, the same carrier frequency is used in the transmission and reception of data whereas in FDD, the different transmission directions are separated in frequency.

Typically, authorities allocate given frequency bands for a communication systems. In case of LTE based systems, different frequency bands are allocated for FDD and for TDD use. Each frequency band comprises multiple carriers. The traffic on adjacent carriers may cause interference. Especially in LTE based systems, where more than one network operator may be allocated carriers on the same frequency band. To allow flexibility, it is possible in LTE TDD to utilize different frame configurations in the transmission and reception. The number of uplink and downlink sub frames may be different in different frame configurations. If different operators on adjacent frequency carriers select different frame configurations, the uplink and downlink transmissions on adjacent carriers may cause severe interference. A large guard band may be needed to tackle the interference. The use of a guard band reduces spectral efficiency.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to a more detailed description that is presented later.

According to an aspect of the present invention, there is provided an apparatus, comprising: at least one processor and at least one memory including a computer program code, the at least one memory and the computer program code configured to, with the at least one processor, cause the apparatus at least to: control the transmission and reception of data on one or more carriers utilizing Time Division Duplexing and frames comprising sub frames, where multiple carriers utilized by different apparatuses are synchronized with each other and a predetermined number of sub frames of each frame are reserved for predetermined transmission directions and allocate the rest of the sub frames carrier specifically either in downlink or uplink direction.

According to another aspect of the present invention, there is provided an apparatus comprising: means for controlling the transmission and reception of data on one or more carriers utilizing Time Division Duplexing and frames comprising sub frames, where multiple carriers utilized by different apparatuses are synchronized with each other and a predetermined number of sub frames of each frame are reserved for predetermined transmission directions and means for allocating the rest of the sub frames carrier specifically either in downlink or uplink direction.

According to another aspect of the present invention, there is provided a method comprising: controlling the transmission and reception of data on one or more carriers utilizing Time Division Duplexing and frames comprising sub frames, where multiple carriers utilized by different apparatuses are synchronized with each other and a predetermined number of sub frames of each frame are reserved for predetermined transmission directions and allocating the rest of the sub frames carrier specifically either in downlink or uplink direction.

According to an aspect of the present invention, there is provided a computer program embodied on a distribution medium, comprising program instructions which, when loaded into an electronic apparatus, control the apparatus to: control the transmission and reception of data on one or more carriers utilizing Time Division Duplexing and frames comprising sub frames, where multiple carriers utilized by different apparatuses are synchronized with each other and a predetermined number of sub frames of each frame are reserved for predetermined transmission directions and allocate the rest of the sub frames carrier specifically either in downlink or uplink direction.

LIST OF DRAWINGS

Embodiments of the present invention are described below, by way of example only, with reference to the accompanying drawings, in which FIG. 1 illustrates an example of a radio system;

FIG. 3B illustrates a simplified example of downlink to uplink interference in a TDD system;

FIG. 4 illustrates an example of a frequency band 400 reserved for TDD communication;

FIG. 5 illustrates an example of flexible LTE TDD frame configuration;

FIGS. 6A and 6B are examples of TDD frame configurations;

DESCRIPTION OF SOME EMBODIMENTS

Exemplary embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Embodiments of present invention are applicable to any network element, node, base station, relay node, server, corresponding component, and/or to any communication system or any combination of different communication systems that support required functionalities. The communication system may be a wireless communication system or a communication system utilizing both fixed networks and wireless networks. The protocols used and the specifications of communication systems, servers and user terminals, especially in wireless communication, develop rapidly. Such development may require extra changes to an embodiment.

Therefore, all words and expressions should be interpreted broadly and are intended to illustrate, not to restrict, the embodiment.

Figure 1:
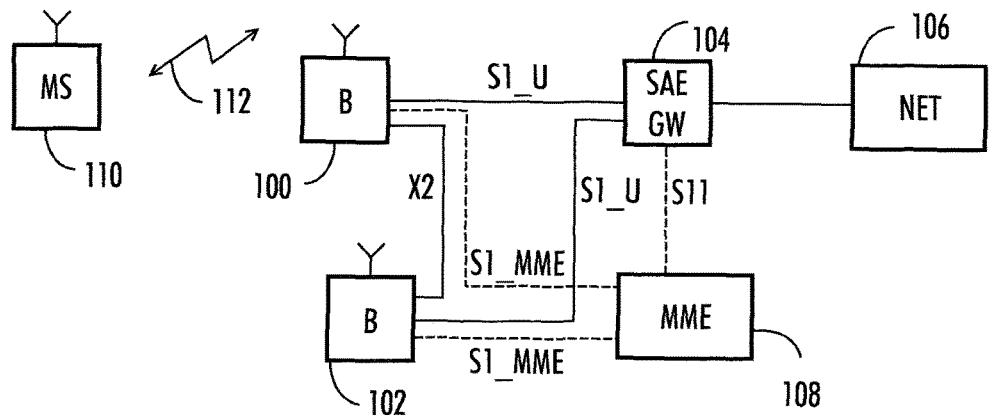

With reference to FIG. 1, let us examine an example of a radio system to which embodiments of the invention can be applied. In this example, the radio system is based on LTE network elements. However, the invention described in these examples is not limited to the LTE radio systems but can also be implemented in other radio systems.

A general architecture of a communication system is illustrated in FIG. 1. FIG. 1 is a simplified system architecture only showing some elements and functional entities, all being logical units whose implementation may differ from what is shown. The connections shown in FIG. 1 are logical connections; the actual physical connections may be different. It is apparent to a person skilled in the art that the systems also comprise other functions and structures. It should be appreciated that the functions, structures, elements, and protocols used in or for group communication are irrelevant to the actual invention.

Therefore, they need not be discussed in more detail here. The exemplary radio system of FIG. 1 comprises a service core of an operator including the following elements: an MME (Mobility Management Entity) 108 and an SAE GW (SAE Gateway) 104. It should be appreciated that the communication system may also comprise other core network elements besides SAE GW 104 and MME 108.

Base stations that may also be called eNodeBs (Enhanced node Bs) 100, 102 of the radio system may host the functions for Radio Resource Management: Radio Bearer Control, Radio Admission Control, Connection Mobility Control, Dynamic Resource Allocation (scheduling). The MME 108 is responsible for distributing paging messages to the eNodeBs 100, 102. The eNodeBs are connected to the SAE GW with an S1_U interface and to MME with an S1_MME interface. The eNodeBs may communicate with each other using an X2 interface. The SAE GW 104 is an entity configured to act as a gateway between the network and other parts of communication network such as the Internet 106, for example. The SAE GW may be a combination of two gateways, a serving gateway (S-GW) and a packet data network gateway (P-GW).

FIG. 1 illustrates user equipment UE 110 located in the service area of the eNodeB 100. User equipment refers to a portable computing device. Such computing devices include wireless mobile communication devices, including, but not limited to, the following types of devices: mobile phone, smartphone, personal digital assistant (PDA), handset, laptop computer. The apparatus may be battery powered.

In the example situation of FIG. 1, the user equipment 110 has a connection 112 with the eNodeB 100. The connection 112 may be a bidirectional connection related to a speech call or a data service such as browsing the Internet 110.

FIG. 1 only illustrates a simplified example. In practice, the network may include more base stations and more cells may be formed by the base stations. The networks of two or more operators may overlap, the sizes and form of the cells may vary from what is depicted in FIG. 1, etc.

The embodiments are not restricted to the network given above as an example, but a person skilled in the art may apply the solution to other communication networks provided with the necessary properties. For example, the connections between different network elements may be realized with Internet Protocol (IP) connections.

Figure 2:
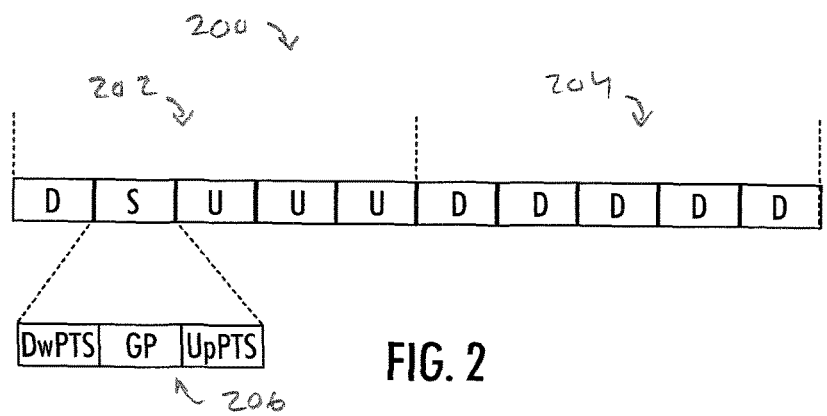
FIG. 2 illustrates an example of LTE TDD frame configuration.

FIG. 2 illustrates an example of LTE TDD frame configuration. The length of the frame 200 is 10 ms and it comprises two 5 ms half frames 202, 204. Each half frame comprises five sub frames of 1 ms length. The sub frames be allocated either to downlink or uplink. There are a given number of different frame configurations defined. In each of these configurations, a given predetermined number of sub frames are allocated to downlink directions and given predetermined number of sub frames to uplink direction. To ensure proper configurability and compatibility with other existing TDD systems such as TD-SCDMA (Time Division Synchronous Code Division Multiple Access) a special sub frame 206 is applied when an uplink frame follows a downlink sub frame. These special frames are located at predetermined places within a radio frame. The special sub frame comprises a downlink pilot timeslot DwPTS, a guard period GP and an uplink pilot timeslot UpPTS. The DwPTS is used for downlink data and control signaling and it includes also signaling needed for downlink synchronization and cell initial search. The UpPTS can be used for sounding reference signals and random access channel.

The example frame of FIG. 2 comprises six downlink frames (denoted with D), a special frame (denoted with S) and three uplink frames (denoted with U). A frame may comprise one or two special frames. Currently, the eNodeB's of a network may not itself change the uplink/downlink allocation of the sub frames. The only way is to change the frame configuration.

Figure 3A:
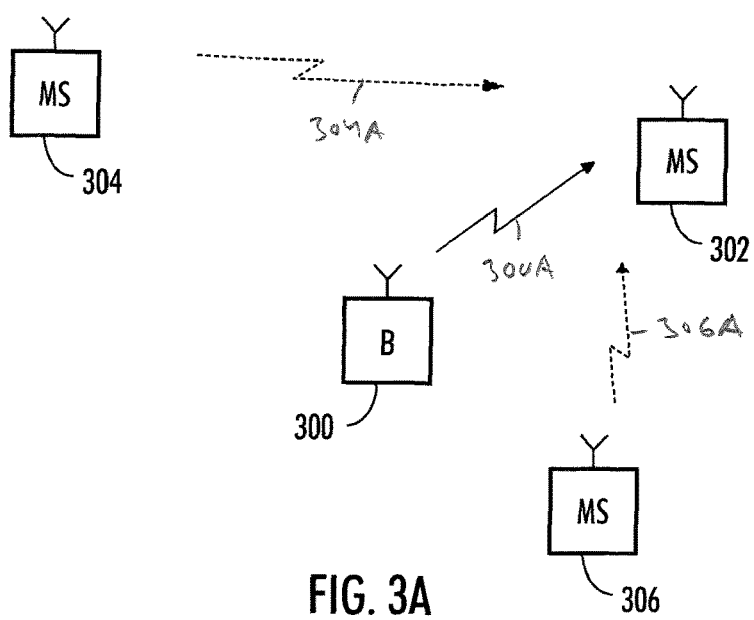
FIG. 3A illustrates a simplified example of uplink to downlink interference in a TDD system.

FIG. 3A illustrates a simplified example of uplink to downlink interference in a TDD system. In the example situation of FIG. 3A, an eNodeB 300 is transmitting to user equipment 302. At the same time, user equipment 304 and 306 belonging to another operator are transmitting 304A, 306A to the eNodeB they are connected to. (These eNodeB's are not shown.) If the carriers used by the user equipment are adjacent to the carrier used by the eNodeB the transmissions 304A, 306A may interfere with the desired transmission 300A as the uplink/downlink ratio of the frames used by the user equipment 304, 306 and the eNodeB 300 are different in such a way that the transmissions occur at the same time.

FIG. 3B illustrates a similar simplified example of downlink to uplink interference in a TDD system. Here, user equipment 302 is transmitting 302B to eNodeB 300. Other eNodeB's 310, 312 are transmitting 310B, 312B to user equipment they are connected to and these transmissions may interfere with the desired transmission if the carriers used are adjacent.

FIG. 4 illustrates an example of a frequency band 400 reserved for TDD communication. The frequency band comprises a set of carriers. The carrier bandwidth may be 5 MHz, for example. At both sides of the TDD band there may be a frequency band 402, 404 allocated for FDD use. In the example of FIG. 4, the TDD frequency band 400 is divided between four different operators. Each operator has a set of carriers 406, 408, 410 and 412, reserved for communication. An operator has the control within the set of carriers allocated to it and may control the adjacent channel interference to be below desired level. However, an operator is not able to control traffic or transmission direction on a carrier belonging to a different operator. This may be the case also in certain deployment scenarios even if multiple carriers belong to the same operator.

In an embodiment of the invention, some coordination between multiple carriers of a same TDD band belonging to one or more operator is employed. The multiple carriers reserved for TDD are time synchronized with each other.

This ensures that the frames start at the same time. In an embodiment, each frame comprises a given number of sub frames which are protected from adjacent channel interference by reserving the protected sub frames for a predetermined transmission direction. Thus on each carrier, a given number of predetermined sub frames are for downlink only, and another given number for uplink only. In addition, predetermined sub frames may be reserved as the special sub frames.

As the same sub frames on each carrier regardless of the operator are reserved for the same transmission direction, the frames do not experience cross-link adjacent channel interference.

In an embodiment, control signalling which is critical to the operation of the network is transmitted in the predetermined number of sub frames reserved for predetermined transmission directions. The critical control signaling may comprise system information, synchronisation channel, uplink and/or downlink scheduling grants, random access channels, channel state information, sounding reference signal and hybrid automatic repeat and request (HARQ) acknowledgements, for example.

The coordinated usage of protected sub frames may be utilized not only within a TDD band but also when a FDD carrier is adjacent to a TDD carrier.

Thus, a predetermined number of sub frames of each frame are reserved for predetermined transmission directions. In an embodiment, the rest of the sub frames, which may be denoted as non-protected sub frames, may be allocated by each individual eNodeB carrier specifically either in downlink or uplink direction without coordination between the eNodeB's of one or more operators. The use of non-protected sub-frames may be limited to uplink channels, downlink channels or both. An eNodeB may allocate all non-protected sub frames to uplink, all to downlink, or divide the sub frames between the transmission directions.

The loose coordination between the carriers of multiple operators including the use of protected and non-protected sub frames eliminates the need for large guard bands between the operators. The flexibility of the TDD spectrum usage increases as the frame configuration is flexible.

In an embodiment, predetermined limitations may be applied in the transmissions using the non-protected sub frames.

For example, a transmitter may be configured to limit the maximum transmission power or power spectral density when transmitting on a non-protected sub frame. In addition, there may be limitations in the allocation of Physical Resource Blocks (PRB). These limitations may be applied to control and reduce adjacent channel interference.

The non-protected sub-frames may be arranged to support specific interference measurement to identify possible cross-link interference problems.

For example, the scheduler of an eNodeB can provide an uplink sub-frame or sub frames without any uplink signals allocated. The eNodeB may then measure and identify possible downlink to uplink interference problems related to the sub frames in question.

The eNodeB can configure dedicated Channel State Information (CSI) measurement (and reporting) for at least one non-protected sub-frame. This allows the eNodeB to identify possible uplink to downlink interference problem at the user equipment side. Thus, the eNodeB may request user equipment to measure a given sub frame and report the measurements. The user equipment can utilize either Common Reference Signal or CSI-RS (CSI Reference Signal) as a phase reference for these measurements. The measurements may relate to Channel Quality Indicator, Rank Indicator and Precoding Matrix Indicator which the user equipment is reporting to the eNodeB via uplink, for example.

In an embodiment, the eNodeB can also monitor Quality of Service (QoS) statistics per sub-frame, and specifically per non-protected sub-frames. This is another way for the eNodeB to identify potential uplink to downlink interference problem at the user equipment side.

The eNodeB can act proactively for minimizing the cross-link interference problems by adjusting the usage of non-protected sub-frames based on cross-link interference measurements. For example, if one of the above described actions indicate that a given sub frame or sub frames suffer from cross-link interference, the eNodeB may change the allocation of the sub frame or sub frames, by apply uplink instead of downlink or vice versa.

In an embodiment, specific TDD frame configuration may be utilised when coordination between transmissions on multiple carriers is desired. FIG. 5 illustrates an example of a frame configuration where a predetermined number of sub frames of each frame are reserved for predetermined transmission directions. The sub frames allocated for downlink direction are denoted with D, sub frames allocated for uplink direction are denoted with U and special sub frames with S. The allocation of these sub frames is coordinated between carriers, i.e. an eNodeB on its own may not allocate them to a different transmission direction. This protects the sub frames from adjacent channel cross-link interference.

In addition, the frame of FIG. 5 comprises sub frames which an eNodeB may allocate carrier specifically either in downlink or uplink direction. These flexible sub frames or non-protected sub frames are denoted with F. In principle, the eNodeB may schedule these non protected sub frames sub frame specifically. The use of special sub frame between a downlink and uplink sub frame should be taken into account. It should be noted that the frame configuration illustrated in FIG. 5 is merely an example, and the same functionality can be achieved with other frame configurations as well.

In an embodiment, the eNodeB may utilise the TDD frame as additional downlink carrier (FDD Carrier Aggregation). The TDD carrier may be used as Secondary Cell (downlink).

Here, all flexible or non-protected sub frames can be allocated to downlink traffic. FIG. 6A illustrates this embodiment. In this case, there are some scheduler restrictions related to the protected uplink sub-frames (frames numbered 2 and 7). The scheduler of the eNodeB may not allocate any traffic to the sub frames in question.

The scheduling restrictions may cover also UpPTS portion of the special sub-frame (frames numbered 1 and 6). This approach may be feasible especially for the upper TDD band at the border of an FDD spectrum (border 412/404 in FIG. 4).

In an embodiment, the eNodeB may utilise the TDD frame as an additional uplink carrier (FDD Carrier Aggregation). The TDD carrier may be used as Secondary Cell (uplink). Here, all flexible or non-protected sub frames are allocated to uplink traffic. FIG. 6B illustrates this embodiment. In this case, there are some scheduler restrictions related to the protected downlink sub-frames (frames numbered 0, 1, 5 and 6). The scheduler of the eNodeB may not allocate any traffic to the sub frames in question. Scheduling restrictions may cover only DwPTS portion of the special sub-frame. This approach may be feasible especially for the lower TDD band at the border of FDD spectrum (border 402/406 in FIG. 4).

In an embodiment, adjacent channel cross-link interference (both Adjacent Channel Leakage Ratio ACLR and Adjacent Channel Power ACP) may be tackled on flexible sub frame by applying a virtual guard band. Such a virtual guard band can be established by multiplexing a received signal (with a band width of 5 MHz, for example) both to the digital channel receive filter for 5 MHz as well as to a narrowed digital channel receive filter e.g. for 3 MHz. In case of a conflicting flexible sub frame, the scheduler and receiver of the eNodeB may be configured to use the data from the digital channel receive filter for 3 MHz. In the transmitter side zeroed coefficients may be placed in the virtual guard band region.

For larger victim bandwidths (for example 10 MHz), interference management could be based on 2×5 MHz carrier aggregation where the interfered 5 MHz uplink component carrier is simply not used in the flexible sub frame case. In the protected or non-conflicting flexible sub frame case it may be used.

Figure 7:
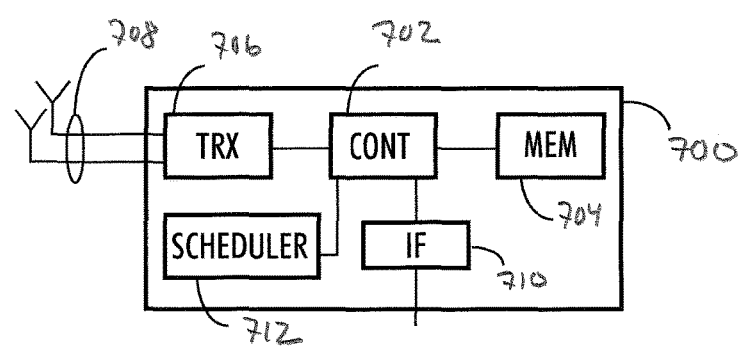
FIG. 7 illustrates an example of an eNodeB.

FIG. 7 illustrates an example of an eNodeB or a base station 700. The eNodeB 700 comprises a controller 702 operationally connected to a memory 704. The controller 702 controls the operation of the base station. The memory 704 is configured to store software and data. The eNodeB comprises a transceiver 706 is configured to set up and maintain a wireless connection to user equipment within the service area of the base station. The transceiver 706 is operationally connected the controller 702 and to an antenna arrangement 708. The antenna arrangement may comprise a set of antennas. The number of antennas may be two to four, for example. The number of antennas is not limited to any particular number.

The base station may be operationally connected to other network elements of the communication system. The network element may be an MME (Mobility Management Entity), an SAE GW (SAE Gateway), a radio network controller (RNC), another base station, a gateway, or a server, for example. The base station may be connected to more than one network element. The base station 700 may comprise an interface 710 configured to set up and maintain connections with the network elements.

In an embodiment, the base station comprises a scheduler 712 configured to perform resource allocation and power control operations described above. The scheduler may be operationally connected to the controller and the memory. In an embodiment, the controller and the scheduler are configured to control the transmission and reception of data on one or more carrier utilizing Time Division Duplexing and frames comprising sub frames, where multiple carriers utilized by different apparatuses are synchronized with each other and a predetermined number of sub frames of each frame are reserved for predetermined transmission directions and allocate the rest of the sub frames carrier specifically either in downlink or uplink direction.

The steps and related functions described above and in the attached figures are in no absolute chronological order, and some of the steps may be performed simultaneously or in an order differing from the given one. Other functions can also be executed between the steps or within the steps. Some of the steps can also be left out or replaced with a corresponding step.

The apparatuses or controllers able to perform the above-described steps may be implemented as an electronic digital computer, which may comprise a working memory (RAM), a central processing unit (CPU), and a system clock. The CPU may comprise a set of registers, an arithmetic logic unit, and a controller. The controller is controlled by a sequence of program instructions transferred to the CPU from the RAM. The controller may contain a number of microinstructions for basic operations. The implementation of microinstructions may vary depending on the CPU design.

The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

An embodiment provides a computer program embodied on a distribution medium, comprising program instructions which, when loaded into an electronic apparatus, are configured to control the apparatus to execute the embodiments described above.

The computer program may be in source code form, object code form, or in some intermediate form, and it may be stored in some sort of carrier, which may be any entity or device capable of carrying the program. Such carriers include a record medium, computer memory, read-only memory, and a software distribution package, for example. Depending on the processing power needed, the computer program may be executed in a single electronic digital computer or it may be distributed amongst a number of computers.

The apparatus may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

It will be obvious to a person skilled in the art that, as technology advances, the inventive concept can be implemented in various ways. The invention and its embodiments are not limited to the examples described above but may vary within the scope of the claims.

The invention claimed is:

1. An apparatus comprising:
   at least one processor and at least one memory including a computer program code, the at least one memory and the computer program code configured, with the at least one processor, to cause the apparatus at least to:
control in a network comprising an access node and one or more second access nodes transmission and reception of data on one or more carriers at the access node utilizing a frame configuration for Time Division Duplexing in frames comprising sub frames, where multiple carriers utilized in the network are synchronized with each other, wherein the frame configuration comprises flexible sub frames and a predetermined number of sub frames reserved for predetermined transmission directions at the access node and one or more second access nodes; and
allocate the flexible sub frames at the access node carrier specifically and individually for the access node either in downlink or uplink direction.

2. The apparatus of claim 1, wherein part of the predetermined number of sub frames is reserved for uplink and part for downlink transmission.

3. The apparatus of claim 1, wherein the multiple carriers are utilized by one or more network operators.

4. The apparatus of claim 1, wherein the multiple carriers are located on the same band reserved for Time Division Duplexing communication.

5. The apparatus of claim 1, wherein critical control signaling is transmitted in the predetermined number of sub frames reserved for predetermined transmission directions, and wherein the critical control signaling comprises at least one of the following system information, synchronization channel, uplink/downlink scheduling grants, random access channels, channel state information, sounding reference signal and hybrid automatic repeat and request acknowledgements.

6. The apparatus of claim 1, wherein the at least one memory including the computer program code is configured with the at least one processor to cause the apparatus to apply predetermined limitations in the transmissions when controlling the transmission and reception utilizing the flexible sub frames.

7. The apparatus of claim 6, wherein the at least one memory including the computer program code is configured with the at least one processor to cause the apparatus to limit the maximum transmission power, power spectral density when controlling the transmission and reception utilizing the predetermined number of sub frames.

8. The apparatus of claim 1, wherein the at least one memory including the computer program code is configured with the at least one processor to cause the apparatus to allocate the flexible sub frames for one transmission direction.

9. The apparatus of claim 8, wherein the at least one memory including the computer program code is configured with the at least one processor to cause the apparatus to limit use of the sub frames of the predetermined number of sub frames is reserved to a reverse transmission direction.

10. The apparatus of claim 8, wherein the at least one memory including the computer program code is configured with the at least one processor to cause the apparatus to aggregate the carrier where the flexible sub frames are allocated for one transmission direction with a Frequency Division Duplexing carrier of a given transmission direction.

11. The apparatus of claim 1, wherein the at least one memory including the computer program code is configured with the at least one processor to cause the apparatus to utilize at least one of the flexible sub frames for interference measurements and/or to command user equipment to utilize at least one of the flexible sub frames for interference measurements.

12. The apparatus of claim 11, wherein the at least one memory including the computer program code is configured with the at least one processor to cause the apparatus to limit the bandwidth used in the transmission and reception utilizing sub frames experiencing interference.

13. The apparatus of claim 1, wherein the access node is an access node for Long Term Evolution or Long Term Evolution Advanced.

14. The apparatus of claim 1, wherein use of the flexible sub frames is limited to uplink channels or downlink channels.

15. The apparatus of claim 1, wherein the flexible sub frames are allocated dynamically.

16. A method comprising:
controlling in a network comprising an access node and one or more second access nodes a transmission and reception of data on one or more carriers at the access node utilizing a frame configuration for Time Division Duplexing in frames comprising sub frames, where multiple carriers utilized in the network are synchronized with each other, wherein the frame configuration comprises flexible sub frames and a predetermined number of sub frames reserved for predetermined transmission directions at the access node and the one or more second access nodes; and
allocating the flexible sub frames at the access node carrier specifically and individually for the access node either in a downlink or uplink direction.

17. A computer program embodied on a distribution medium, comprising program instructions which, when loaded into an electronic apparatus, control the apparatus to:
control in a network comprising an access node and one or more second access nodes a transmission and reception of data on one or more carriers at the access node utilizing a frame configuration for Time Division Duplexing in frames comprising sub frames, where multiple carriers utilized in the network are synchronized with each other, wherein the frame configuration comprises flexible sub frames and a predetermined number of sub frames reserved for predetermined transmission directions at the access node and the one or more second access nodes; and
allocate the flexible sub frames at the access node carrier specifically and individually for the access node either in a downlink or uplink direction.

* * * * *